Jan. 5, 1937.  A. HIMMEL  2,066,779
HAULING DRUM
Filed March 7, 1935  2 Sheets-Sheet 1

Inventor
Adolf Himmel
by Karl Michaelis
Atty.

Jan. 5, 1937. A. HIMMEL 2,066,779
HAULING DRUM
Filed March 7, 1935 2 Sheets-Sheet 2

Inventor
Adolf Himmel
by Karl Michaelis
Atty.

Patented Jan. 5, 1937

2,066,779

UNITED STATES PATENT OFFICE 2,066,779

HAULING DRUM

Adolf Himmel, Tubingen, Germany, assignor to Himmelwerk A.-G., Tubingen/Wurttemberg, Germany Application March 7, 1935, Serial No. 9,743
In Germany September 20, 1934

3 Claims. (Cl. 74—280)

My invention relates to driven drums such as hauling drums, cable drums, chain drums, winches or the like, which are driven from an electro-motor arranged in the interior of the drum by way of a suitable gearing and preferably by an electro-motor in which the rotor revolves about this stator.

In drums of this kind, which are of greater axial length, it has been found that although the teeth of the power transmitting gearing may be perfectly shaped, there nevertheless arise shocks and concussions in the gearing, which do not only increase the noise, but also involve increased waste of the teeth. Thorough investigations have shown that this deficiency is due to the fact that the long axle which carries the stator of the electro-motor, the drum and the intermediate gearing, is set oscillating in consequence of the periodically repeated pressures at the pitch line and from other causes and that these oscillations are liable to disturb the accurate interaction of the moving parts.

This drawback is avoided, according to the present invention, by providing an additional support for the rotor of the electro-motor, which revolves about the stationary axle, this support being arranged in the gear casing fixed to and revolving together with the drum. This additional support of the rotor acts towards maintaining a correct contact between the pinion connected with the rotor and the toothed gear wheel meshing therewith either by altogether preventing the long axle from sagging by means of a separate rigid bearing or by forcing the coacting pinions by means of a bearing following the movements of the axle to nevertheless remain in correct contact with each other.

In the drawings affixed to this specification and forming part thereof three embodiments of my invention are illustrated diagrammatically by way of example.

In the drawings

Fig. 1 is an elevation, partly in axial section, of the first embodiment, while

Figure 1:
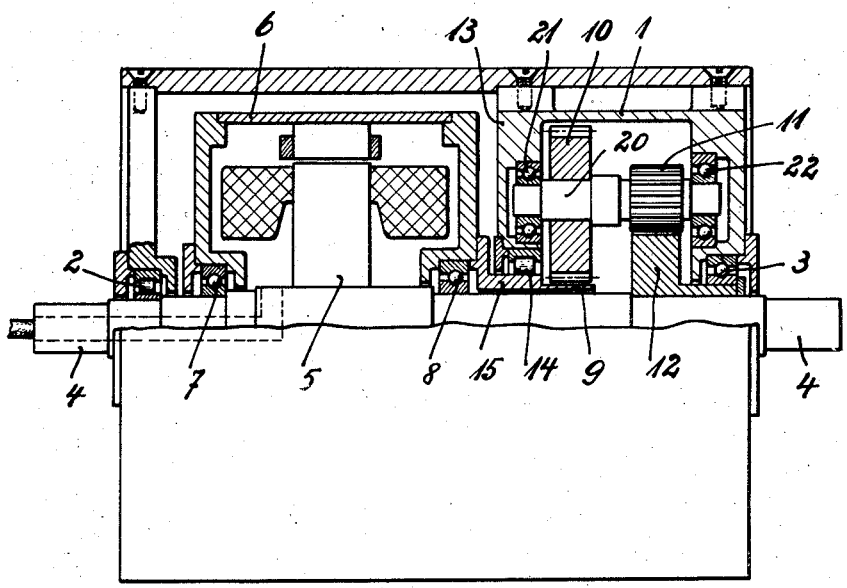

Referring to the drawings and first to Fig. 1, 1 is the drum proper and 2 and 3 are antifriction bearings supporting the drum on the stationary axle 4; 5 is the stator of the electromotor driving the drum and 6 is the rotor encircling the stator and revolving about the axle 4 on antifriction bearings 7 and 8. 15 is a sleeve fixed on one side of the rotor 6 and 9 is a pinion formed on the free end of said sleeve and meshing with the pinion 10 forming part of the power transmitting gearing, the shaft 20 of the pinion 10 being supported in antifriction bearings 21, 22 in the side walls of the gear case 13 fixed to the drum 1. On the shaft 20 is also mounted a pinion 11 which rolls on a toothed wheel 12 fixed on the axle 4.

In order to prevent the axle 4 from sagging and oscillating, the additional bearing 14, which is here shown as a roller bearing, is inserted between the sleeve 15 and the wall of the case 13. This bearing 14 forces the sleeve to retain its concentric position relative to the drum 1 and at the same time the bearing 14, by means of bearing 8, prevents the axle from oscillating.

Figure 2:
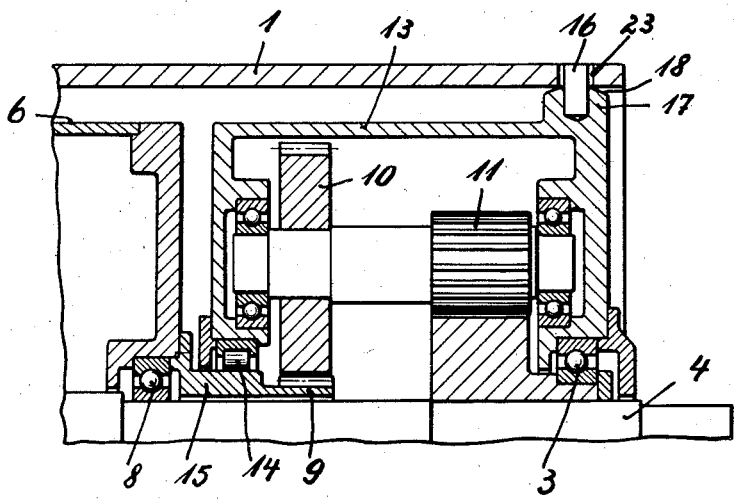
Figs. 2 and 3 are axial sections, drawn to a larger scale, of part of the intermediate gear and the adjoining part of the rotor, of two further modifications.

In the modification illustrated in Fig. 2 the axle 4 is not prevented from oscillating, but here the oscillations are paralyzed, for here the gear case 13, instead of being rigidly fixed to the drum 1, is merely loosely geared with the drum at the end averted from the bearing 8, a pin 16 mounted in a projection 17 of the gear case, the outer end of which is rounded off at 18, projecting with a clearance into a slot 23 of the drum. Obviously in this construction the additional bearing 14 now causes the gear case 13 to follow any oscillations of the axle 4 and to therein maintain the accurate contact between the pinions 9 and 10.

Figure 3:
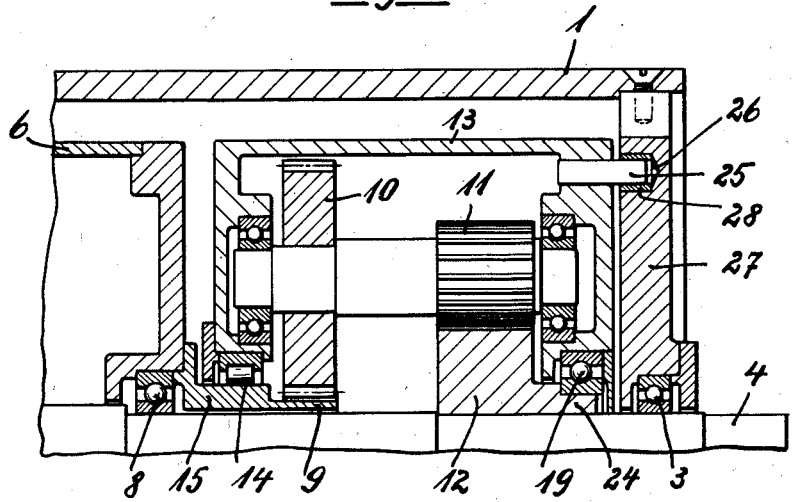

In the modification illustrated in Fig. 3 the gear case 13 is supported on one side by the additional bearing 14 and on the other side by another additional bearing 19 mounted on the hub 24 of the stationary toothed wheel 12, while the drum is coupled with the gearing by means of a pin 25 projecting into a depression 26 formed in the side wall 27 of the drum, an elastic sleeve 28 being preferably inserted between the pin and the depression 26.

Obviously the pin and slot or pin and depression coupling may be replaced by any other suitable coupling.

Obviously this invention is not only applicable to hauling drums, but also to all other hollow rotational bodies driven by an electro-motor and a gearing arranged within such bodies.

I wish it to be understood that I do not desire to be limited to the exact details or constructions shown and described for obvious modifications will occur to a person skilled in the art.

In the claims affixed to this specification no selection of any particular modification of the invention is intended to the exclusion of other modifications thereof and the right to subsequently make claim in the present application to any modification not covered by these claims is expressly reserved.

I claim:

1. In hoisting mechanism in combination, a stationary axle, a hauling drum and a bearing supporting said drum at either end on said axle for relative rotation, the stator of an electromotor being fixed on said axle within said drum, the rotor of said electromotor surrounding said stator within said drum, a gear case arranged on said axle in line with said rotor and coupled with said drum for rotation about said axle, a bearing supporting said rotor on said axle at either end, a sleeve fixed to said rotor extending through the adjoining end wall of said gear case and a separate bearing inserted between this wall of the gear case and said sleeve and forming a third support for said rotor.

2. In hoisting mechanism in combination, a stationary axle, a hauling drum and a bearing supporting said drum at either end on said axle for relative rotation, the stator of an electromotor being fixed on said axle within said drum, the rotor of said electromotor surrounding said stator within said drum, a gear case arranged on said axle in line with said rotor and coupled with said drum for rotation about said axle, a bearing supporting said rotor on said axle at either end, a sleeve fixed to said rotor extending through the adjoining end wall of said gear case, a separate bearing inserted between this wall of the gear case and said sleeve and forming a third support for said rotor, and another bearing inserted between said axle and the other end wall of said gear case.

3. In hoisting mechanism in combination, a stationary axle, a hauling drum and a bearing supporting said drum at either end on said axle for relative rotation, the stator of an electromotor being fixed on said axle within said drum, the rotor of said electromotor surrounding said stator within said drum, a gear case arranged on said axle in line with said rotor and loosely engaging said drum for rotation about said axle, a bearing supporting said rotor on said axle at either end, a sleeve fixed to said rotor extending through the adjoining end wall of said gear case and a separate bearing inserted between this wall of the gear case and said sleeve and forming a third support for said rotor.

ADOLF HIMMEL.